United States Patent [19]

Mitsuishi et al.

[11] 4,348,446
[45] Sep. 7, 1982

[54] POLYESTER FILM HAVING IMPROVED SLIPPERINESS

[75] Inventors: Yukio Mitsuishi; Shigeru Shiozaki, both of Machida; Takao Chujo, Sagamihara; Takeyuki Yokoyama, Fujisawa, all of Japan

[73] Assignee: Teijin Limited, Osaka, Japan

[21] Appl. No.: 183,901

[22] Filed: Sep. 4, 1980

Related U.S. Application Data

[63] Continuation-in-part of Ser. No. 882,467, Mar. 1, 1978, abandoned.

[30] Foreign Application Priority Data

Mar. 1, 1977 [JP] Japan .................................. 52-20892
Nov. 24, 1977 [JP] Japan ................................ 52-139870

[51] Int. Cl.$^3$ ................................................ G11B 5/70
[52] U.S. Cl. ..................................... 428/148; 360/134; 428/149; 428/150; 428/328; 428/329; 428/330; 428/331; 428/409; 428/483; 428/694; 428/900
[58] Field of Search .............. 428/910, 900, 147, 148, 428/327, 328, 329, 330, 338, 339, 409, 425.9, 692, 694, 65, 143, 480, 910, 150, 483, 323, 331; 427/127, 128, 129; 360/134, 135, 136

[56] References Cited

U.S. PATENT DOCUMENTS

| 3,382,206 | 5/1968 | Karickhoff | 260/40 R |
| 3,419,460 | 12/1968 | Ure | 260/40 R |
| 3,669,931 | 6/1972 | Innis et al. | 260/75 R |
| 3,821,156 | 6/1974 | Farrar | 260/40 R |
| 3,958,064 | 5/1976 | Brekken et al. | 428/900 |
| 3,967,025 | 6/1976 | Tanabe et al. | 427/129 |
| 3,980,611 | 9/1976 | Anderson | 260/40 R |
| 3,983,285 | 9/1976 | Riboulet et al. | 428/910 |
| 4,071,654 | 11/1978 | Ogama et al. | 428/900 |
| 4,097,656 | 6/1978 | Shirahata et al. | 427/128 |
| 4,112,187 | 9/1978 | Asakura et al. | 427/128 |
| 4,135,031 | 1/1979 | Ahashi et al. | 428/900 |
| 4,163,823 | 8/1979 | Legras | 427/128 |
| 4,187,343 | 2/1980 | Yamaguchi et al. | 428/900 |
| 4,233,352 | 11/1980 | Ono et al. | 428/900 |

FOREIGN PATENT DOCUMENTS

| 2807147 | 9/1978 | Fed. Rep. of Germany | 428/900 |
| 49-51306 | 6/1974 | Japan | 428/900 |
| 52-31721 | 8/1977 | Japan | 428/910 |

Primary Examiner—Stanley S. Silverman
Attorney, Agent, or Firm—Sughrue, Mion, Zinn, Macpeak & Seas

[57] ABSTRACT

A biaxially oriented polyester film containing fine particles of insoluble inert substance, has a kinetic coefficient of friction of not more than 0.3, and has microscopic protrusions integrated thereto, said protrusion having an peak-to-valley height of not more than 1 micron mostly range of 0.2 to 0.5 micron. The film having improved slipperiness is useful as the base film of magnetic recording tape for a video tape recorder or a computer data storage.

15 Claims, 1 Drawing Figure

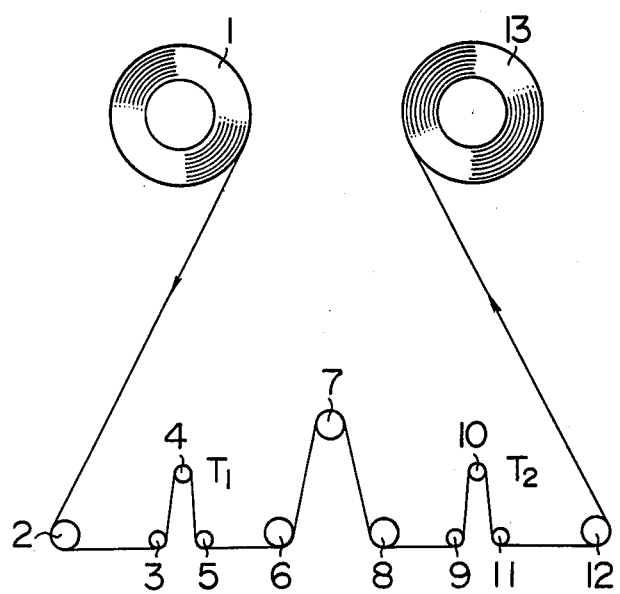

POLYESTER FILM HAVING IMPROVED SLIPPERINESS

CROSS-REFERENCE TO RELATED APPLICATION

This application is a continuation-in-part of U.S. application Ser. No. 882,467, filed Mar. 1, 1978, now abandoned.

BACKGROUND OF THE DISCLOSURE

1. Field of the Invention

The present invention relates to improvement of the slipperiness (free of interfacial sticking during winding operation) of polyester films transported (winding) at low speed under low tension, and the polyester film of the present invention is useful as the base-film of a magnetic recording tape for a video tape recorder (VTR) or a computer data storage system.

2. Summary of Prior Art

The magnetic recording tape for VTR use is transported at low speed (0.5–40 cm/sec) under low tension (5–50 grams). Therefore, the tape is required to have an exceedingly high slipperiness and an excellent abrasion resistance.

To improve the slipperiness of a film, it is effective to make the surface of the film microscopically uneven; and the known techniques for that purpose are, for example, incorporation of inorganic fine particles in the polymer of a raw material of the film, and eduction of insoluble residues of catalyst in the polymer.

Abrasion resistance is necessary for magnetic recording tapes to endure repeated uses; and the abrasion may be classified into two categories, fatigue abrasion and frictional one. The former results from the continued movement of polyester film-based magnetic tape during use. Movement of a magnetic tape in contact with a tape transport abrades the uncoated side of the magnetic tape with the resultant formation of fragments thereof (debris), which results in temporary and permanent errors in the reading of the information stored on the magnetic oxide coating. This occurs as a result of wind-up of the tape. The debris on the surface of the uncoated side is transferred and deposited on the magnetic layer (coated side) of the tape, and causes separation of the tape from the head for reading the stored information. This error may be considered as temporary because the debris can be partly removed from the surface of the tape by tape-cleaning, etc. In many instances, however, debris particles are pushed into the magnetic layer during wind-up, and cause indentations in the surface of the tape. Such indentation causes head-to-tape separation resulting in a loss of information.

On the other hand, the frictional abrasion results from the considerable frictional resistance applied to the film during manufacturing or, later, processing of the film prior to coating with magnetic coating, or in the course of the reproduction of information. Polyester debris particles are formed on the uncoated surface of the film in the form of white powders, when a polyester film is being passed over rolls rotating at different speeds, or passed over stationary rods or stationary guides. For example, if the surface to be coated with magnetic coating contains debris, the debris is coated, and the portion of the film surface covered with debris remains uncoated. This coated debris results in a nonuniform tape surface. Nodules, formed by the debris overcoated with the magnetic coating on the otherwise smooth tape surface, may result in a loss of recorded information. For this reason, both fatigue and frictional abrasion of the film should be controlled as low as possible. To reduce the fatigue and the abrasion resistance between film and film, or film and metal, it is necessary to lower the friction coefficient therebetween.

The improvement of the slipperiness of polyester film can be attained by incorporating an insoluble, chemically inert additive having wide particle size distribution in the polymer. For example, U.S. Pat. No. 3,980,611 discloses a method to improve the winding characteristics of a polymer film while keeping its high transparency by incorporating not more than about 0.25% by weight of an inert additive to the polymer, wherein not less than 70% of the total amount of the additive is composed of coarse particles having particle diameters of greater than 2.5 microns and fine particles having particle diameters of less than 1 micron. It has been made clear, however, that although the surface protrusions of the film originated in the additives having particle sizes of greater than 2.5 microns are effective in improving the slipperiness of the film, they give only an unsatisfactory result in the improvement of the abrasion resistance thereof, in case of the low speed transport of the film under low tension. Even by the method for the improvement of the resistance of a film-based magnetic tape to the frictional abrasion and the fatigue resistance, disclosed in U.S. Pat. No. 3,821,156, comprising incorporating fine particles of an inert additive selected from the group consisting of silica and hydrated aluminum silicate together with coarse particles of calcium carbonate [$CaCO_3$] in the polyester, the low speed transport characteristics are found to be poor when the additives contain the particles having particle diameters of greater than 2.5 microns.

SUMMARY OF THE INVENTION

The present invention provides a film of polyester, such as polyalkylene terephthalate, for the base film of magnetic tape which can be transported without trouble at low speed under low tension. The base film of this invention is free of interfacial sticking during winding, has a kinetic friction coefficient between the tape and the transport means in the range from about 0.05 to about 0.25, and has an excellent abrasion resistance.

The present invention is directed to a biaxially oriented polyethylene terephthalate film having an intrinsic viscosity between 0.3 and 1.0 deciliter per gram measured in ortho-chlorophenol at 25° C., a kinetic coefficient of friction of not more than 0.3, and having microscopic protrusions on its surface, wherein the height of said protrusion are not greater than 1 micron and mostly in the range of 0.2 to 0.5 micron. The peak-to-valley value of the surface protrusions of the film is less than about 0.55 micron, especially in the range between 0.2 and 0.5 micron, according to JIS B0601 which corresponds to ISO R468. The film of the present invention can be prepared by adding 0.08 to 2% by weight of fine particles of inert additives being not in excess of 2.5 microns in diameter, composed of 0 to 8% by weight, based on the total amount of the additives, of coarse particles having particle diameters of 1.5 to 2.5 microns, 20 to 50% by weight of particles having particle diameters of 0.5 to 1.5 microns, and 40 to 80% by weight of fine particles having particle diameters of less than 0.5 micron, and having a representative particle size of 0.55 micron or less: and said inert additives being selected, for example, from the group of MgO, ZnO, MgCO₃, CaCO₃, CaSO₄, BaSO₄, Al₂O₃, SiO₂, TiO₂, and calcium and manganese terephthalate. The polymer composition is formed into a film by conventional film forming process, drawn both longitudinally and transversally at the same or different temperatures between 70° C. and 120° C. respectively in an amount of 3 to 5 times its original lengths and 12 to 22 times its original area, and set by heating at a temperature between 190° and 230° C. for 1 to 30 seconds to afford a biaxially oriented film having a thickness of about 3 to 100 microns. By the above process characterized by a combination of inert additives and specific ranges of film-forming, drawing, and heat-setting conditions, a polyester film having high slipperiness can be prepared.

DETAILED DESCRIPTION

The base film of the present invention for the magnetic recording tape is a biaxially oriented polyester film having protrusions of the following distribution (frequency) of height [h (micron)] on at least one surface thereof:

| Height of protrusion | Number of protrusions per unit area |
|---|---|
| $1.0 \geq h > 0.75$ | 0 to 14/mm² |
| $0.75 \geq h > 0.5$ | 5 to 150/mm² |
| $0.5 \geq h > 0.25$ | at least 40/mm² |

A film having protrusions of more than 14/mm² whose heights are larger than 0.75 micron but not exceed 1.0 micron, and those of less than 40/mm² whose heights are larger than 0.25 micron but not exceed 0.5 micron, exhibits poor transportability and low abrasion resistance.

A film, having protrusions of not more than 14/mm² whose height are larger than 0.75 micron but not exceed 1.0 micron, and those of at least 40/mm² whose heights are larger than 0.25 micron but not exceed 0.5 micron, is especially excellent in its transportability. Therefore, to obtain a film satisfactory both in its transportability and abrasion resistance at low speed under low tension, the following conditions must be satisfied at the same time: the number of protrusions having height [h(micron)] of $1.0 \geq h > 0.75$ is 14/mm² or less, and that of $0.5 \geq h > 0.25$ is 40/mm² or more. Protrusions having height of $0.75 \geq h > 0.5$ are not so effective in improving the transportability and abrasion resistance of the film as the protrusions having height of $1.0 \geq h > 0.75$ or $0.5 \geq h > 0.25$.

On the other hand, the number of protrusions exceeding 1.0 micron in height is desired to be as small as possible. However, preparation of slurry completely free from particles which cause protrusions having a height exceeding 1 micron on the surface of the film, the conditions of the preparation change with the film-forming conditions, may, depending on the kind of the inert substance, be difficult to be carried out industrially advantageously. Similarly, it may sometimes be difficult to carry out industrially advantageously the formation of insoluble catalyst residue having the above particle sizes corresponding to the film forming conditions. Therefore, the existence of the above undesirable protrusions in a small number is not necessarily to be completely excluded provided that it has practically only small detrimental influences.

In the present invention, the preferable combination of the relationships between the number of protrusions per unit area and their heights are:

| | | |
|---|---|---|
| $1.0 \geq h > 0.75$ | 0 to 10/mm² | |
| $0.75 \geq h > 0.5$ | 10 to 100/mm² | (I) |
| $0.5 \geq h > 0.25$ | $\geq 80$/mm² | |

In the above combination, the number of protrusions in the range of $1.0 \geq h > 0.75$ in height is especially preferably 8/mm² or less, most preferably 0/mm²; and, at the same time, it is desirable to satisfy the conditions that the number of protrusions of $0.75 \geq h > 0.5$ is 60/mm² or less and that of $0.5 \geq h > 0.25$ is 100/mm² or more. Although the upper limit of the number of protrusions of $0.5 \geq h > 0.25$ is not specifically restricted, it is usually 400/mm² or less. The number of protrusions of 0.25 micron or less in height is not limited. It seems that the protrusions of 0.2 micron or less in height have little influences on the kinetic friction coefficient and abrasion resistance of the film.

The surface roughness of the film of this invention can be used as a measure of the distribution of the protrusions. The roughness is expressed in terms of PV [peak-to-valley] and CLA [center line average] roughness. The film of this invention has the following relationship between the PV value [y (micron)] and the CLA value [x (micron)]:

$$10x - 0.075 \leq y \leq 10x + 0.125$$

where $0.020 \leq x \leq 0.042$.

The PV value and the CLA value are measured by feeler method of JIS B0601 as follows:

PV value: Profile of the surface of a film is traced throughout the standard base length of 2.6 mm by the feeler-type surface roughness meter (SURFCOM 3B made by Tokyo Seimitsu K.K.) using a feeler having a tip radius of 3 microns under a load of 0.1 gram, and recorded on a chart with magnifications of 50 times along the base length and 20,000 times perpendicular to the plane of the film. A straight line which is the best representation of the segment of said recorded profile corresponding to the standard base length, is drawn on the chart. The highest peak and the deepest valley, based on said straight line, are picked up, and two straight lines are drawn in parallel to the above straight line and passing said peak and said valley respectively. The distance between said two lines is divided by the vertical magnification, or 20,000, and denoted in micron. The average value of 10 PV values thus obtained is referred to as the PV value in this invention.

CLA value: From a profile curve obtained by the method described above, a segment which corresponds to the sample length of 2 mm is picked up. The segment is divided into eight equal sub-segments, each having a length of L (0.25 mm.). The sub-segment of the profile curve is represented by the equation $V = f(u)$ taking the center line of the sub-segment as U axis and the direction of vertical axis of the chart as V axis; and the CLA value of a sub-segment ($R_{CLA}$) is calculated according to the following formula and denoted in micron.

$$R_{CLA} = \frac{1}{L} \int_0^L |f(u)| du$$

From the eight measurements of the $R_{CLA}$ with the length L of 0.25 mm, the largest three are excluded and the average of the remaining five values is adopted as the CLA value in this invention $$\left( x = \frac{1}{n} \Sigma R_{CLA}, \text{ where } n = 5 \right).$$

The preferable relationship between the CLA value (x) and the PV value (v) to obtain the excellent transportability and abrasion resistance at low speed under low tension is:

$$10x - 0.075 \leq y \leq 10x + 0.125$$

where $0.020 \leq x \leq 0.042$.
More preferably, y satisfies the following formula together with the above condition:

$$0.200 \leq y \leq 0.500.$$

The abrasion resistance and transportability are further improved when x and y are within the range denoted by the following formula:

$$10x - 0.050 \leq y \leq 10x + 0.100$$

where
$$0.025 \leq x \leq 0.040.$$

The polyester in the present invention is polymers obtained by the polycondensation of aromatic dicarboxylic acids such as terephthalic acid, isophthalic acid, and naphthalene-2,6-dicarboxylic acid, and glycols such as ethylene glycol, diethylene glycol, tetramethylene glycol, and neopentylene glycol. Said polyester can be prepared by the direct polycondensation of aromatic dicarboxylic acids and glycols, by the ester exchange reaction of carboxylic acid dialkyl esters and glycols followed by the polycondensation of the reaction products, or by the polycondensation of diglycol esters of aromatic dicarboxylic acids. The representative examples of said polymers are polyethylene terephthalate and polyethylene-2,6-naphthalene dicarboxylate. Said polymers may be homopolymers or copolyesters containing not more than 15 mol %, based on the dicarboxylic acid component, of non-aromatic dicarboxylic acids, and/or not more than 15 mol %, based on the diol component, of diols other than aliphatic glycols. Polymer blends composed of at least 85% by weight (preferably at least 90% by weight) of polyesters and less than 15% by weight (preferably less than 10% by weight) of other polymers may also be used. Examples of the polymer as the blending component are polyamides, polyolefins, and polyesters (including polycarbonates) other than the polyesters of the main component. The polyesters may contain additives such as stabilizers, colorants, and anti-oxidants, according to the need.

The polyester, after molded to the film, has an intrinsic viscosity of about 0.3 to 1.0, preferably 0.5 to 0.75 deciliter per gram determined in o-chlorophenol at 25° C.

The inert inorganic fine particles incorporated in the polyesters or the inert catalyst residue formed in the polyesters, whereby the protrusions having the aforementioned sizes and number are formed on the surface of the polyester film, should be insoluble in and not reactive with said polyesters.

Examples of the inert inorganic additives are, MgO, ZnO, $MgCO_3$, $CaCO_3$, $CaSO_4$, $BaSO_4$, $Al_2O_3$, $SiO_2$, $TiO_2$, and Ca and Mn salts of terephthalic acid, kaolin, china clay, diatomaceous earth aluminosilicates, their hydrates, carbon black and calcium phosphate; especially silica, kaolin and calcium carbonate.

The insoluble catalyst residue is fine particles remaining in the polyester as the reaction residue of the catalyst, for example ester exchange catalysts for the manufacture of the polyesters such as alkali metal compounds and alkaline earth metal compounds, polymerization catalysts such as antimony trioxide, germanium compounds and titanium compounds, and stabilizing catalysts such as phosphorous compounds.

The formation of the protrusions on the surface of the film may be effected by incorporating the above inert inorganic fine particles and insoluble catalyst residue singly or in combination. Furthermore, it is needless to say that each of the inert inorganic fine particles and the insoluble catalyst residue may be a mixture of two or more substances.

The following explanation concerns with the inert substances having a desirable particle size distribution of

| | |
|---|---|
| $2.5 \geq d \geq 1.5$ | 0 to 4% |
| $1.5 \geq d \geq 0.5$ | 20 to 40% |
| $0.5 \geq d$ | 50 to 80% | where d denotes the diameter of the particle in micron. The above inert substances can be obtained by various processes which are practicable by people who have expert knowledges of the technical field including the pulverizing and mixing of additives. For example, particles of calcium carbonate can be prepared by classifying the ethylene glycol slurry of the calcium carbonate using a classifier (for example, Tomoe Kogyo P-660 Super-Decanter). The particles of calcium terephthalate are obtained by dividing the block of the substance into particles of appropriate sizes by applying shear, compression or impact force and classifying the resulting particles; and those of calcium phosphate are prepared by crushing the commercially obtainable calcium phosphate dispersed in water by a sand mill, and conducting the operation one or several times until the sizes of the particles in the slurry reach to the desired value. The diameter of the particle referred to in the present invention is Stokes' diameter.

The inert substance is added to the polyester to give a homogeneous dispersion. The addition of the particles can be carried out prior to the polymerization of the polyester, during the polymerization reaction, at the pelletizing stage in an extruder after the completion of the polymerization, or at the sheet extrusion stage of the molten polyester; and the addition prior to the polymerization is most preferable.

The amount of the inert substance is 0.08 to 2% by weight, preferably 0.10 to 0.5% by weight.

When the ratio of the amount of inert substance having the particle size [d (micron)] of $2.5 \geq d > 1.5$ to the total amount of the inert substance exceeds 8%, the abrasion resistance of the film lowers to the undesirable level, and the film containing less than 40% by weight, based on the total inert substance, of the inert substance having the particle size of not larger than 0.5 micron, has rather poor transportability. The addition of the inert substance containing not more than 8% of the component having particle size [d] of $2.5 \geq d > 1.5$ and at least 40% of the component having particle size of not larger than 0.5 micron gives a film having especially excellent transportability. Therefore, to obtain a film which is satisfactory both in the transportability and abrasion resistance at low speed under low tension, the amount of the inert substance having particle sizes of $2.5 \geq d \geq 1.5$ and that of $0.5 \geq d$ should be not more than 8% and 40 to 80% of the total amount of the inert substance, respectively. The particles having diameters of $1.5 \geq d > 0.5$ are not so effective for the improvement of the transportability and abrasion resistance of the film compared with the particles having diameters of $2.5 \geq d > 1.5$ or $0.5 \geq d$. The object of this invention is considered to be achieved even if the amount of the particles whose diameters are in the range of $1.5 \geq d > 0.5$ is very small; however, it is not practical to prepare industrially the slurry of the inert substance which is free of the particles of the above diameter range. Although it is ideal to completely eliminate the coarse particles, whose diameters are larger than 2.5 microns, from the inert additives, yet the existance of a sufficiently small amount of such particles not to cause detrimental effects to the film is permissible.

In the present invention, the preferable combination of the particle sizes and their amounts of the inert substance is:

| | | |
|---|---|---|
| $2.5 \geq d > 1.5$ | 0 to 4% | |
| $1.5 \geq d > 0.5$ | 20 to 40% | (II) |
| $0.5 \geq d$ | 50 to 80% | | and especially preferably

| | |
|---|---|
| $2.5 \geq d > 2.0$ | 0 to 3% |
| $1.5 \geq d > 1.0$ | 4 to 20% | in addition to the condition (II).

The particle size of the inert substance has no lower limitation, and usually it is about 0.005 micron.

Since the condition (II) defines the particle diameters of the inert substance and their constitutional ratios within certain ranges (the particle size distribution may differ to some degree), the representative particle diameter (a diameter corresponding to the 50% by weight of the particle size-amount cumulative distribution curve of the inert substance) may differ largely.

To satisfy the transport and abrasion resistant requirements at the same time, the representative particle diameter is 0.55 micron or less, preferably 0.50 micron or less, and especially preferably 0.43 micron or less. Although the representative diameter has no lower limitation, it is usually about 0.1 micron.

The film forming conditions to prepare the film of this invention having protrusions of aforementioned numbers and heights on the surface vary with the kinds, combination of the kinds, and amounts of the inert inorganic fine particles added to the polyester, and the kinds and amounts of the insoluble catalyst residues. The film forming conditions such as temperature of the casting drum, temperatures of longitudinal and transverse drawing, longitudinal and transverse draw ratios (areal draw ratio), heat-setting temperature, and film-forming speed, have substantial influences upon the numbers and heights of the protrusions. The above conditions are greatly affected by the intrinsic viscosity of the film.

The polyester film of the present invention can be prepared, for example, by drawing the undrawn polyester film having an intrinsic viscosity $[\eta]$ of 0.35 to 1.0 obtained by the melt extrusion of the polyester at a temperature between the melting point (Tm) and Tm+70° C., to the longitudinal or the transverse direction at a temperature between the second order transition point (Tg) of the polyester and Tg+70° C. at a draw ratio of 2.5 to 5.0, and subsequently to the direction which makes a right angle with the first drawing direction (when the first drawing direction is longitudinal, the second is transverse) at a temperature between Tg and Tg+70° C. and a draw ratio of 2.5 to 5.0. The area draw ratio is preferably between 12 and 22. The drawing process may be the simultaneous biaxial drawing as well as the successive biaxial drawing described above.

Thus biaxially oriented film is set by heating at a temperature between Tg+70° C. and Tm, in case of polyethylene terephthalate between 190° C. and 230° C., for 1 to 100 seconds. Higher longitudinal and transverse drawing temperature, smaller longitudinal and transverse draw ratios (areal draw ratio), higher heat-setting temperature and lower intrinsic viscosity of the film (when the heat-setting temperature is same, the low intrinsic viscosity of the film has an effect of relatively high heat-setting temperature) tend to give protrusions higher in their height and larger in number.

The thickness of the film is 3 to 100 microns, preferably 4 to 50 microns, most preferably 8 to 25 microns.

When the metal rolls of the tape transport system contact only one side of the film, it is also effective to make the contact side of the film a surface condition obtained by the addition of the inert substance having the particle size distribution defined by the present invention, and make the other side of the film a rough surface by the addition of an inert substance having a particle size distribution different from that of the substance of this invention, or leave it a smooth surface free from inert additives.

The film having the surface protrusion distribution of the present invention has excellent transportability and abrasion resistance at low speed (0.5 to 40 cm/sec) under low tension (5 to 50 grams). The low tensioned (5 to 50 grams) region referred to in this specification is the tensioned region of the entrance part of the tape transport system (tape base testing machine) denoted by $T_1$ in FIG. 1, and the tension is based on the tape width of ½ inch. If the tape width is 1 inch, the tension of the low tensioned region is between 10 and 100 grams. The width of the film in this invention is not specifically restricted, and usually, a tape with a width between 3/20 inch (3.8 mm) and 5 inches (127 mm) is preferably used.

The film of the present invention can be applied to every existing use of polyester films, and above all, it is best fitted for the base film of magnetic recording tape, especially magnetic tape for the data cartridge of a large capacity memory system of a computer or for VTR.

Methods for the determination of several physical properties used in the present invention are given as under.

(1) Height and number of the protrusions

Aluminum is uniformly vacuum evaporated onto the surface of the film to be examined to a thickness of 400 to 500 Å or less, and a collodion layer is applied to the reverse, non-metallized side of the film and dried. Arbitrary ten spots on the film surface are photographed with a visible monochromatic light multiple interference reflection microscope (for example, manufactured by Carl Zeiss JENA in East Germany) at a magnification of 100, and the number of the protrusions in each photograph is counted with reference to their heights, and converted into the number per 1 mm². The sum of the fields of the tenphotographs corresponds to 1.55 mm².

(2) Kinetic friction coefficient ($\mu k$)

A tape base testing machine for the measurement of the kinetic friction coefficient of a rough film surface is schematically shown in the FIGURE.

In the FIGURE, 1 is an unwinding reel, 2 is tension control means, 3, 5, 6, 8, 9 and 11 are free rollers, 4 is tension detecting means (entrance side), 7 is a stationary rod made of SUS 27 (20 mm $\phi$, outer diameter), 10 is tension detecting means (exit side), 12 is a guide roller, and 13 is a winding reel.

As shown in the FIG. 1, a polyester film having a rough surface is transported at a speed of 25 cm/sec at 25° C. and a relative humidity of 60%, its rough surface being in contact with the stationary rod made of SUS 27 (surface roughness: 0.3 S, outer diameter: 20 mm $\phi$) with a wrapping arc angle of $\theta = (152/180)\pi$ radian (152°). The tension at the entrance part $T_1$ is adjusted to 30 grams by the tension controller 2, and the tension at the exit part $T_2$ (gram) is measured by the exit side tension detecting means 10 after 30-meter running of the film. The kinetic friction coefficient $\mu k$ is calculated according to the following equation:

$$\mu k = \frac{2.303}{\theta} \log \frac{T_2}{T_1} = 0.868 \log \frac{T_2}{T_1}$$

where $\theta = 152°$ ($=(152/180)\pi$ radian).

An oriented polyester film of a kinetic friction coefficient of 0.05 to 0.30, especially lower than 0.25 containing inert substances having the above-mentioned particle diameters and constitutional ratios is preferable because of its low fluctuations of the tensions at the entrance ($T_1$) and the exit ($T_2$) during the transportation of the film, and its especially excellent transportability as well as its high abrasion resistance.

(3) Particle sizes and constitutional ratios.

Ranges of the sedimentation time corresponding to the ranges of the particle diameters (d) (for example, 0.5 micron or less, $1.5 \geq d > 0.5$, and $2.5 \geq d > 1.5$) are calculated by the Stokes' equation:

$$T = \frac{18 \eta h}{G(\rho_p - \rho_o) \times d^2}$$

where
T: Sedimentation time (sec)
$\eta$: Viscosity of medium (g/cm.sec=poise)
h: Sedimentation distance (cm)
G: Acceleration of gravity (980 cm/sec²)
$\rho_P$: Density of inert substance (g/cm³)
$\rho_o$: Density of medium (g/cm³)
d: Size of inert substance (diameter, cm)

The weights of the inert substance settled within the time ranges calculated above are measured by a Shimadzu Automatic Sedimentation Balance, and the constitutional ratio (%) of each fraction is obtained by dividing the weight by the total weight of the inert substance. Repesentative particle diameter Constitutional ratios of the fractions which correspond to the narrower ranges of particle diameters (for example, $d \leq 0.25$, $0.5 \geq d > 0.25$, $0.75 \geq d > 0.5$, $1.0 \geq d > 0.75$, etc.) are calculated, summed up successively from the fraction of larger diameters to that of smaller ones to obtain a cumulative curve (particle diameter of zero micron corresponds to 100%). The particle diameter which corresponds to the 50% point on the curve is defined as the representative diameter (micron).

(4) Evaluation of abrasion resistance.

A 1500-meter polyester film is passed through the tape base testing machine described before under the same conditions as the measurement of kinetic friction coefficient $\mu k$, provided that the stationary rod of SUS 27 is wrapped with tissue paper (Scotch Dusting Fabric No. 610) with the aid of a double-coated adhesive tape. The abrasion resistance is classified into five grades as follows according to the amount of white powder attached to the tissue paper.

Grade 1. Free from white powder. Extremely excellent abrasion resistance.

Grade 2. A small amount of white powder. Satisfactorily fit for use.

Grade 3. White powder speckled all over the tissue paper. Unfit for use.

Grade 4. White powder more than grade 3. Unfit for use.

Grade 5. White powder covering the whole surface of the tissue paper. Worst frictional abrasion.

(5) Overall evaluation

The mark represents a film having excellent transportability and abrasion resistance; O, both properties of the film are sufficiently good for practical use; $\Delta$, both properties inferior to the preceding two cases to some extent, still satisfactorily fit for use; and X, unfit for practical use.

The following examples are presented for purposes of illustrations.

EXAMPLES 1-4, COMPARATIVE EXAMPLES 1-2

Ester exchange reaction of dimethyl terephthalate was carried out in the presence of catalysts consisting of 40 millimol % of manganese acetate, 20 millimol % of antimony trioxide and 40 millimol % of phosphorous acid; and 0.20% by weight of kaolin specially prepared to have a particle diameter [d (micron)] distribution of:

| | |
|---|---|
| $d \leq 0.5$ | 61.7% |
| $0.5 < d \leq 1.5$ | 35.5% |
| $1.5 < d \leq 2.5$ | 3.0% | was added to the above ester exchange reaction product. The composition was polymerized to polyethylene terephthalate having the intrinsic viscosity $[\eta]$ of 0.65 (determined in o-chlorophenol at 25° C.).

The polyethylene terephthalate was dried at 160° C. and melt extruded at 280° C. onto a casting drum maintained at 40° C., where it was quenched and solidified. The undrawn film thus obtained was subjected to the successive biaxial orientation (The first drawing is longitudinal, and successively to the transverse direction) at a drawing temperature, draw ratios, and an areal ratio given in the Table 1, and set by heating at a temperature given in the Table 1 for 10 seconds. The films thus obtained 16 microns in thickness and had intrinsic viscosities between 0.61 and 0.63 (100 c.c./g).

Test samples with length of 1500 meters were prepared by slitting the above films to the width of ½ inch. The properties of the test samples were examined by the tape base testing machine shown in FIG. 1.

Table 1 shows the numbers of protrusions per unit area (number/mm²) existing on the film surface with reference to their heights (h: micron), the kinetic friction coefficient, the grade of the abrasion resistance, and the result of the overall evaluation of each film. The kaolin, which was used in the present examples as the inert substance, contained 0% of the fraction corresponding to the particle diameters of $2.5 \geq d > 2.0$. It can be realized that the film of the present invention is excellent both in its transportability and abrasion resistance.

or a specific amount of coarser silica (Comparative Example 4) having the particle diameter distribution of

| | |
|---|---|
| $d \leq 0.5$ | 22.9% |
| $0.5 < d \leq 1.5$ | 58.8% |
| $1.5 < d \leq 2.5$ | 17.1% | were added as the inert substances. Table 2 shows the number of protrusions per unit area [number/mm²] with reference to their heights [h (microns)], the kinetic friction coefficient, the grade of the abrasion resistance, and the result of the overall evaluation of each film.

TABLE 2

| | | | Examples | | | Comparative Examples | |
|---|---|---|---|---|---|---|---|
| | | | 5 | 6 | 7 | 3 | 4 |
| | | | 0.30 wt % | 0.50 wt % | 0.13 wt % | 0.07 wt % | 0.25 wt % |
| Film-forming Conditions | Drawing Temperature (°C.) | Longitudinal | 95 | 95 | 95 | 95 | 95 |
| | | Transverse | 105 | 105 | 105 | 105 | 105 |
| | Draw Ratio | Longitudinal | 3.5 | 3.5 | 3.5 | 3.5 | 3.5 |
| | | Transverse | 4.0 | 4.0 | 4.0 | 4.0 | 4.0 |
| | Areal Draw Ratio | | 14.0 | 14.0 | 14.0 | 14.0 | 14.0 |
| | Heat-Setting Temperatures (°C.) | | 225 | 225 | 225 | 225 | 225 |
| Film Characteristics | Number of Protrusions per 1 mm² | $1.0\mu \geq h > 0.75$ | 2 | 4 | 2 | 0 | 15 |
| | | $0.75\mu \geq h > 0.5$ | 85 | 142 | 66 | 22 | 114 |
| | | $0.5\mu \geq h > 0.25$ | 197 | 328 | 111 | 49 | 142 |
| | Kinetic Friction Coefficient μk | | 0.09 | 0.085 | 0.14 | 0.45 | 0.20 |
| | Grade of Abrasion Resistance | | 1 | 1 | 2 | 1~2 | 5 |
| | Overall Evaluation | | ⊚ | ⊚ | ○ | x | △ |

TABLE 1

| | | | Examples | | | | Comparative Examples | |
|---|---|---|---|---|---|---|---|---|
| | | | 1 | 2 | 3 | 4 | 1 | 2 |
| Film-Forming Condition | Drawing Temperature (°C.) | Longitudinal | 83 | 95 | 95 | 95 | 95 | 95 |
| | | Transverse | 85 | 115 | 110 | 105 | 105 | 105 |
| | Draw Ratio | Longitudinal | 4.6 | 3.5 | 3.8 | 3.5 | 3.5 | 3.0 |
| | | Transverse | 3.1 | 4.7 | 4.4 | 4.0 | 4.0 | 3.2 |
| | Areal Draw Ratio | | 14.3 | 16.5 | 16.7 | 14.0 | 14.0 | 11.9 |
| | Heat-Setting Temperature (°C.) | | 200 | 225 | 225 | 225 | 238 | 225 |
| Film Characteristics | Number of Protrusions per 1 mm² | $1.0\mu \geq h > 0.75\mu$ | 0 | 2 | 5 | 10 | 15 | 16 |
| | | $0.75\mu \geq h > 0.5\mu$ | 42 | 30 | 42 | 72 | 108 | 104 |
| | | $0.5\mu \geq h > 0.25\mu$ | 107 | 81 | 90 | 131 | 185 | 161 |
| | Kinetic Friction Coefficient μk | | 0.13 | 0.18 | 0.14 | 0.13 | 0.12 | 0.13 |
| | Grade of Abrasion Resistance | | 1 | 1 | 1 | 1~2 | 2 | 2 |
| | Overall Evaluation | | ⊚ | ⊚ | ⊚ | ○ | △ | △ |

EXAMPLES 5–7, COMPARATIVE EXAMPLES 3–4

Films having thickness of 16 microns and the intrinsic viscosities of between 0.61 and 0.63 were prepared by the method described in the preceding examples provided that the specific amounts of silica (Examples 5–7, Comparative Example 3) having the particle diameter [d (micron)] distributions of

| | |
|---|---|
| $d \leq 0.5$ | 74.3% |
| $0.5 < d \leq 1.5$ | 24.7% |
| $1.5 < d \leq 2.0$ | 1.0% |

EXAMPLES 8–12, COMPARATIVE EXAMPLES 5–7

Ester exchange reaction of dimethyl terephthalate was carried out in the presence of catalysts consisting of 40 millimol % of manganese acetate, 20 millimol % of antimony trioxide, and 40 millimol % of phosphorous acid, and given amounts of specific inert substances each having specific constitutional ratios with reference to the particle size, and specific representative particle diameter shown in Table 3, were added to the above reaction product. The compositions were polymerized to polyethylene terephthalate having the intrinsic viscosity [η] of 0.65 (determined in o-chlorophenol at 25° C.).

The polyethylene terephthalate compositions were dried at 160° C. and melt extruded at 280° C. onto a casting drum maintained at 40° C., where the compositions were quenched and solidified to the undrawn films of thickness of 213 microns.

The undrawn films thus obtained were subjected to the successive biaxial orientation (areal draw ratio of 13.3) comprising the first longitudinal drawing at a temperature of 90° C. and a draw ratio of 3.5 and the second transverse drawing at a temperature of 120° C. and a draw ratio of 3.8, and set by heating at 210° C. for 10 seconds. The films thus obtained were 16 microns in thickness. Test samples with length of 1500 meters were prepared by slitting the above films to the width of ½ inch. The properties of the test samples were examined by the tape base testing machine shown in FIG. 1.

Table 3 shows the intrinsic viscosity, kinetic friction coefficient, grade of the abrasion resistance, and the result of the overall evaluation of each film.

TABLE 3

|  |  | Particle Diameter (d) | Examples | | | | | Comparative Examples | | |
| --- | --- | --- | --- | --- | --- | --- | --- | --- | --- | --- |
|  |  |  | 8 Silica | 9 Silica | 10 Calcium Carbonate | 11 Kaolin | 12 Silica | 5 Kaolin | 6 Silica | 7 Calcium Carbonate |
| Additive | Particle Size | d ≦ 0.5 | 44.2 | 52.4 | 52.3 | 61.1 | 65.9 | 35.5 | 22.9 | 6.1 |
|  | Distribution (%) | 0.5μ < d ≦ 1.5 | 50.0 | 39.6 | 43.8 | 35.3 | 32.6 | 47.1 | 58.8 | 35.9 |
|  |  | 1.5μ < d ≦ 2.5 | 5.8 | 8.0 | 3.9 | 3.0 | 1.5 | 14.1 | 17.1 | 42.8 |
|  | Representative Diameter (μ) |  | 0.55 | 0.50 | 0.48 | 0.43 | 0.39 | 0.65 | 0.85 | 1.70 |
|  | Amount of Additive (wt %) |  | 0.15 | 0.20 | 0.20 | 0.30 | 0.50 | 0.30 | 0.30 | 0.30 |
| Intrinsic Viscosity (100cc/g) |  |  | 0.61 | 0.62 | 0.61 | 0.62 | 0.62 | 0.62 | 0.61 | 0.62 |
| Kinetic Friction Coefficient μk |  |  | 0.26 | 0.24 | 0.25 | 0.13 | 0.08 | 0.41 | 0.45 | 0.48 |
| Grade of Abrasion Resistance |  |  | 1 | 2 | 1 | 1 | 1 | 3 | 5 | 5 |
| Overall Evaluation |  |  | O | O | ◎ | ◎ | ◎ | x | x | x |

Both of the inert additives of the Examples 11 and 12 contained 0% of the fraction having particle diameters of 2.5≧d>2.0, and had remarkable contributions to the abrasion resistance. The content of the fraction having above particle diameter range was about 1.5% in the inert substance of the Example 10, which had a grade of abrasion resistance similar to (or somewhat lower than) those of the Examples 11 and 12.

It can be realized from the above results that the polyester film of the present invention has excellent transportability and abrasion resistance at low speed under low tension.

EXAMPLE 13, COMPARATIVE EXAMPLE 8

A magnetic coating composition comprising acicular γ-hematite and a binder (vinyl acetate-vinyl chloride copolymer) was applied to the surface of the films obtained in the Example 1 and the Comparative Example 4 with 5-micron thickness. The reverse side was left uncoated. Test samples with length of 150 meters were prepared by slitting the magnetic tape obtained above to the width of ½ inch. The test samples were repeatedly subjected to the recording and reproducing processes using the Nippon Victor's HR3300 Video Tape Recording Deck, kept on the shelf for one week after rewinding, and the increase of the number of drop-outs was measured by subjecting the same portion of the tape as mentioned before to the recording and reproducing processes. The drop-outs were counted by Japan Automatic Control's IDC-2 type Drop-out Counter with the threshold set at 15 μsec in width and 18 dB in depth.

The numbers of the drop-outs (the average number per minute in the first five minutes) of the magnetic tape of Example 13 comprising the film of Example 1 were 30.4/minute after the first recording and reproduction, 8.6/minute after the tenth recording and reproduction, and 45.4/minute after 1 week's storage; while those of the magnetic tape of comparative Example 8 comprising the film of Comparative Example 4 were 62.5/minute, 74.2/minute and 136.2/minute, respectively.

The drop-out was found to be originated from the abrasion of the surface of the base film by the examination of scratches thereof through a differential interference microscope.

It is a proof of the above statement that the magnetic tape (Example 13) comprising the film of this invention (Example 1) had few scratches on the surface of the base film showing an excellent abrasion resistance, while the magnetic tape (Comparative Example 8) comprising the base film (Comparative Example 4) had many and deep scratches showing an inferior abrasion resistance.

The film of the Comparative Example 4 having six protrusions of the height of 1.0 micron or more per 1 mm$^2$ of the surface, was found to have poor abrasion resistance. From the above results, it can be concluded that the polyester film of the present invention has excellent transportability and abrasion resistance at low speed under low tension.

EXAMPLE 14

A polyethylene terephthalate polymer was prepared using 110 ppm manganese acetate 450 ppm antimony trioxide and adding 0.3 weight % of silica having the particle diameter [d(micron)] distribution of

| d ≦ 0.5 | 74.3% |
| --- | --- |
| 0.5 < d ≦ 1.5 | 24.7% |
| 1.5 < d ≦ 2.0 | 1.0% |

Ester-exchange reaction was conducted at atmospheric pressure until methanol had been completely withdrawn from the reactor and then a polycondensation was run conventionally under reduced pressure. A polymer having an intrinsic viscosity of 0.65 dl/g was obtained.

The polymer was dried at 160° C. and was introduced into a conventional extrusion apparatus from which molten polymer was continuously extruded into a film at 280° C. The film was quenched and solidified on a casting drum at 40° C. The as-cast film was stretched 3.5 times longitudinally at 95° C. and then stretched 4.0 times transversally at 105° C. The film was heat set at 225° C. for 10 seconds under restraint. The instrinsic viscosity, distribution of the surface protrusions, static and kinetic coefficients of friction, CLA value, PV value and abrasion resistance are set forth in Table 4.

EXAMPLE 15

A polymer was obtained as in Example 14 using 200 ppm of calcium acetate, 40 ppm lithium glycolate, and 450 ppm antimony trioxide and adding 0.7 weight % of the silica used in Example 14. The properties of the film are set forth in Table 4.

tive diameter: 0.54 micron) having a particle size distribution of

| d ≦ 0.5 | 40.9% |
|---|---|
| 0.5 < d ≦ 1.5 | 51.1% |
| 1.5 < d ≦ 2.5 | 8.0% |
| 2.5 < d | 0% |

The properties of the film are shown in Table 5.

(4) Film X having thickness of 16 microns and the intrinsic viscosity of 0.63 was prepared by the method

TABLE 4

| Example | [η] | Surface protrusions (per mm²) | | | | ASTM | | haze | CLA | PV | Transportability | Abrasion Resistance | Overall Estimation |
|---|---|---|---|---|---|---|---|---|---|---|---|---|---|
| | | 0.25 < h ≦ 0.5 | 0.5 < h ≦ 0.75 | 0.75 < h ≦ 1 | 1 < h | μs | μd | % | value | value | μk | | |
| 14 | 0.61 | 197 | 85 | 2 | 0 | 0.53 | 0.51 | 7.8 | 0.027 | 0.275 | 0.09 | 1 | Excellent |
| 15 | 0.61 | 141 | 35 | 1 | 0 | 0.46 | 0.48 | 3.0 | 0.026 | 0.225 | 0.12 | 1 | Excellent |

EXAMPLE 16

(1) Ester exchange reaction of dimethyl terephthalate was carried out in the presence of catalysts consisting of 40 millimol % of manganese acetate, 20 millimol % of antimony trioxide and 40 millimol % of phosphorous acid; and 0.30% by weight of Kaolin-1(hydrated aluminum silicate; representative diameter=0.34 micron) specially prepared to have a particle diameter [d(micron)] distribution of

| d ≦ 0.5 | 79.1% |
|---|---|
| 0.5 < d ≦ 1.5 | 20.0% |
| 1.5 < d ≦ 2.5 | 0.9% |
| 2.5 < d | 0% | was added to the above ester exchange reaction product. The composition was polymerized to polyethylene terephthalate having the intrinsic viscosity [η] of 0.65 (determined in o-chlorophenol at 25° C.).

The polymer was dried, cast and heat set as in Example 14.

The film (Film A) thus obtained, 16 microns in thickness, had the intrinsic viscosity of 0.62. The distribution (number and height) of the surface protrusions of the film, CLA value, PV value and abrasion resistance as well as an overall evaluation of the film are shown in Table 5.

(2) Polyethylene terephthalate film (Film B) was prepared in the same manner as described in Film A with the exception of using 0.3 weight % of Kaolin-2 (representative diameter: 0.52 micron) prepared to have a particle diameter distribution of

| d ≦ 0.5 | 46.3% |
|---|---|
| 0.5 < d ≦ 1.5 | 50.7% |
| 1.5 < d ≦ 2.5 | 3.0% |
| 2.5 < d | 0.0% |

The physical properties of a 16-micron thick Film B were measured and the results are also shown in Table 5.

(3) The polyethylene terephthalate film (Film C) was produced in the same manner as Film A with the exception of using 0.3% by weight of Kaolin-3 (representadescribed in the preceding examples provided that the combination of 0.25% by weight of Kaolin-1 and 0.05% by weight of calcium carbonate-1 (representative diameter: 0.8 micron) having particle size distribution of

| d ≦ 0.5 | 20.3% |
|---|---|
| 0.5 < d ≦ 1.5 | 70.8% |
| 1.5 < d ≦ 2.5 | 4.5% |
| 2.5 < d ≦ 5.0 | 4.4% |
| 5.0 < d ≦ 10.0 | 0% | were added as inert substances. Total distribution of additives in Film X was as follows:

| d ≦ 0.5 | 69.3% |
|---|---|
| 0.5 < d ≦ 1.5 | 28.5% |
| 1.5 < d ≦ 2.5 | 1.5% |
| 2.5 < d ≦ 5.0 | 0.7% |
| 5.0 < d ≦ 10.0 | 0% |

(5) Film Y having thickness of 16 microns was prepared in the same manner as described in Film X with the exception of using 0.25 weight % of Kaolin-3 and 0.05 weight % of calcium carbonate-2 (representative diameter: 1.58 micron) having particle size distribution of

| d ≦ 0.5 | 1.0% |
|---|---|
| 0.5 < d ≦ 1.5 | 47.0% |
| 1.5 < d ≦ 2.5 | 26.0% |
| 2.5 < d ≦ 5.0 | 23.9% |
| 5.0 < d ≦ 10.0 | 2.1% |

Total distribution of additives in Film Y was:

| d ≦ 0.5 | 34.3% |
|---|---|
| 0.5 < d ≦ 1.5 | 50.4% |
| 1.5 < d ≦ 2.5 | 11.0% |
| 2.5 < d ≦ 5.0 | 4.0% |
| 5.0 < d ≦ 10.0 | 0.3% |

Physical properties of Film X and Film Y are shown in Table 5.

Film A, Film B and Film C are embodiments of the instant invention, whereas Film X and Film Y are comparative examples.

obtained. It is clear that an additive comprising particle size greater than 2.5 microns affects the transportability at low speed and abrasion resistance.

TABLE 5

|  |  | Particle Diameter (d: micron) | Examples | | | Comparative Examples | |
|---|---|---|---|---|---|---|---|
|  |  |  |  |  |  | Film X Kaolin-1 and Calcium Carbonate-1 | Film Y Kaolin-3 and Calcium Carbonate-2 |
|  |  |  | Film A Kaolin-1 | Film B Kaolin-2 | Film C Kaolin-3 |  |  |
| Additive | Particle Size Distribution (%) | d ≤ 0.5 | 79.1 | 46.3 | 40.9 | 69.3 | 34.3 |
|  |  | 0.5 < d ≤ 1.5 | 20.0 | 50.7 | 51.1 | 28.5 | 50.4 |
|  |  | 1.5 < d ≤ 2.5 | 0.9 | 3.0 | 8.0 | 1.5 | 11.0 |
|  |  | 2.5 < d | 0.0 | 0.0 | 0.0 | 0.7 | 4.3 |
|  | Representative Diameter ($\mu$) |  | 0.34 | 0.52 | 0.54 | — | — |
| Number of Protrusions per 1 mm$^2$ |  | h > 1.0 | 0 | 0 | 0 | 1 | 5 |
|  |  | 1.0 ≥ h > 0.75 | 0 | 6 | 13 | 4 | 16 |
|  |  | 0.75 ≥ h > 0.5 | 32 | 90 | 91 | 56 | 125 |
|  |  | 0.5 ≥ h > 0.25 | 80 | 110 | 103 | 62 | 97 |
| PV value |  |  | 0.25 | 0.34 | 0.40 | 0.25 | 0.45 |
| CLA value |  |  | 0.020 | 0.035 | 0.042 | 0.018 | 0.031 |
| Kinetic Friction Coefficient ($\mu$k) |  |  | 0.24 | 0.09 | 0.13 | 0.30 | 0.31 |
| Grade of Abrasion Resistance |  |  | 1 | 1 | 1 | 3 | 4 |
| Overall Evaluation |  |  | excellent | excellent | excellent | unsatisfactory | unsatisfactory |

Transportability (coefficient of kinetic friction) at various speeds was also measured, and the results obtained were shown in Table 6:

TABLE 6

| Speed of tape; Tention to a half inch wide tape | Coefficient of Kinetic Friction | | | |
|---|---|---|---|---|
|  | Film A | Film B | Film C | Film Y |
| 500 cm/sec; 100 grams | 0.14 | 0.12 | 0.10 | 0.05 |
| 25 cm/sec; 30 grams | 0.24 | 0.09 | 0.13 | 0.31** |
| 3.3 cm/sec; 30 grams | 0.31 | 0.16 | 0.23 | 0.43** |
| 1.1 cm/sec; 30 grams | 0.36* | 0.25 | 0.27 | 0.59** |

Abrasion Resistance:
*Grade 2
**Grade 3–4
Other tested samples were classified as Grade 1

In Example 16 each sample was prepared with soluble catalyst (manganese acetate-antimony oxide), so that all protrusions on the film surface originated only from the additives, i.e., kaolin or kaolin and calcium carbonate. The fine additive having a representative diameter of 0.54 micron or less, and having the maximum size of 2.5 microns or less used in the present invention brings no surface protrusions exceeding 1 micron in height [refer to Film A, Film B and Film C]. Whereas, Film X or Film Y containing coarse particles of calcium carbonate has rough surface with a few protrusions exceeding 1 micron as indicated in Table 5. Thus a small difference in particle size distribution may cause a great difference in height and number of surface protrusions. Where the calcium carbonate used has an average particle size of 0.8 micron or above, polyester films with inferior characteristics were obtained. For instance, Film A where Kaolin-1 having a representative diameter of 0.34 micron was added in the absence of calcium carbonate, has a kinetic friction coefficient of 0.24 and grade of abrasion resistance of 1 (excellent). On the other hand, with Film X where calcium carbonate having an average diameter of 0.8 micron was used, a product having a kinetic friction coefficient of 0.30 and grade of abrasion resistance of 3 (unsatisfactory) was

What is claimed is:

1. A magnetic recording tape comprising a substrate with a magnetic coating thereon, said magnetic recording tape having good transportability and high abrasion resistance and being free of a back lubricant layer, said substrate consisting of a biaxially oriented polyester film having a kinetic friction coefficient at a tape speed of 25 cm/sec in the range from 0.05 to 0.25, and having at least one rough surface with protrusions integrated thereto, said protrusions having a maximum size of 1 micron in height and having an average peak-to-valley height of not more than about 0.55 micron and being originated from an insoluble inert substance having a representative particle diameter of not more than 0.55 micron incorporated into said polyester in an amount ranging from 0.08 to 2% by weight, wherein the height denoted by h (micron) in the range 1.0≧h>0.75, is not more than 14/mm$^2$, 0.75≧h>0.5, is from 5 to 150/mm$^2$, and 0.5≧h, is not less than 40/mm$^2$, and wherein the insoluble inert substance consists essentially of not more than 8% by weight of a fraction having particle diameters, expressed as d in microns, 2.5≧d>1.5 and from 40 to 80% by weight of a fraction of 0.5≧d, said film having an abrasion resistance grade of at least 2 when transported at a speed of 25 cm/sec at 25° C. and 60% relative humidity with said rough surface in contact with an SUS 27 stationary rod wrapped with tissue paper having a surface roughness of 0.35, an outer diameter of 20 mm $\phi$ with a wrapping arc angle of $\theta$=(152/180) $\pi$ radius (152°), said abrasion resistance grade being defined as follows:
Grade 1: free from white powder;
Grade 2: a small amount of white powder;
Grade 3: white powder speckled all over the tissue paper;
Grade 4: white powder more than Grade 3;
Grade 5: white powder covering the whole surface of the tissue paper.

2. A polyester film of claim 1, wherein the inert substance added to the polyester comprises 20 to 50% by weight particles having particle diameters [d(micron)] of 1.5≧d>0.5.

3. A polyester film of claim 2 wherein the height denoted by h in the range of $1.0 \geq h > 0.75$ is 8 or less, $0.75 \geq h > 0.5$ is 60 or less and $0.5 \geq h > 0.25$ is 100 to 400.

4. A polyester film of claim 3 wherein the insoluble inert substance consists essentially of 0–4% by weight of a fraction having particle diameters, expressed as d in microns, $2.5 \geq d \geq 1.5$, 20–40% by weight of a fraction $1.5 \geq d \geq 0.5$ and from 50–80% by weight of a fraction $0.5 \geq d$.

5. A polyester film of claim 4 wherein the insoluble inert substance is incorporated into the polyester in an amount of 0.10–5% by weight.

6. A polyester film of claim 5 wherein the fraction $2.5 \geq d \geq 1.5$ includes 0–3% of a fraction $2.5 \geq d > 2.0$ and the fraction $1.5 \geq d \geq 0.5$ includes 4–20% of a fraction $1.5 \geq d > 1.0$.

7. A polyester film of claim 6, wherein the representative particles diameter, which defines the diameter corresponding to the 50% by weight of the particle size-amount cumulative distribution curve, is 0.43 micron or less.

8. A polyester film of claim 6 wherein the thickness of said film is about 3 to 100 microns.

9. A film of claim 1, wherein the polyester is polyethylene terephthalate.

10. A film of claim 1, wherein said protrusions originate from said insoluble inert substance.

11. A film of claim 1, wherein the surface protrusions having heights denoted by h (micron) of the range $1.0 \geq h > 0.75$ is 0 to 10 mm$^2$, $0.74 \geq h > 0.5$ is 10 to 100/mm$^2$ and $0.5 \geq h > 0.25$ is $> 80$/mm$^2$.

12. A polyester film of claim 1, wherein the insoluble inert substance is selected from the group consisting of MgO, ZnO, MgCO$_3$, CaCO$_3$, CaSO$_4$, BaSO$_4$, Al$_2$O$_3$, SiO$_2$, TiO$_2$ and Ca and Mn salts of terephthalic acid, kaolin, china clay, diatomaceous earth, aluminosilicates, their hydrates, carbon black and calcium phosphate.

13. A polyester film of claim 1, wherein said residue is selected from the group consisting of alkali metal compounds, alkaline earth metal compounds, antimony trioxide, germanium compounds, titanium compounds and phosphorous compounds.

14. A polyester film of claim 1, wherein the representative particle diameter, which defines the diameter corresponding to the 50% by weight of the particle size-amount cumulative distribution curve, is 0.55 micron or less.

15. A polyester film of claim 1 wherein said film carries a magnetic recording layer on one side thereof but is free from a lubricating layer on the other side thereof.

* * * * *